United States Patent
Popov et al.

(10) Patent No.: US 11,799,758 B2
(45) Date of Patent: Oct. 24, 2023

(54) SYSTEM AND METHOD FOR RELATIVE ADDRESSING BASED ON PHYSICAL TOPOLOGY

(71) Applicant: Insight Automation, Erlanger, KY (US)

(72) Inventors: Emil V. Popov, Independence, KY (US); Ivaylo N. Sotirov, Mason, OH (US)

(73) Assignee: Insight Automation, Inc., Erlanger, KY (US)

( * ) Notice: Subject to any disclaimer, the term of this patent is extended or adjusted under 35 U.S.C. 154(b) by 0 days.

(21) Appl. No.: 17/505,880

(22) Filed: Oct. 20, 2021

(65) Prior Publication Data

US 2022/0131787 A1 Apr. 28, 2022

Related U.S. Application Data

(60) Provisional application No. 63/104,991, filed on Oct. 23, 2020.

(51) Int. Cl.
*H04L 45/00* (2022.01)
*H04L 45/02* (2022.01)
*H04L 45/745* (2022.01)

(52) U.S. Cl.
CPC .............. *H04L 45/20* (2013.01); *H04L 45/02* (2013.01); *H04L 45/22* (2013.01); *H04L 45/745* (2013.01)

(58) Field of Classification Search
None
See application file for complete search history.

(56) References Cited

U.S. PATENT DOCUMENTS

| 7,379,424 | B1 * | 5/2008 | Krueger | H04L 45/02 709/239 |
|---|---|---|---|---|
| 7,613,542 | B2 | 11/2009 | Ko et al. | |
| 7,954,621 | B2 | 6/2011 | Brandt et al. | |
| 8,296,488 | B2 | 10/2012 | Westrick, Jr. et al. | |

(Continued)

FOREIGN PATENT DOCUMENTS

| WO | 201357666 A1 | 4/2013 |
|---|---|---|
| WO | 2014154826 A1 | 10/2014 |

OTHER PUBLICATIONS

U.S. Patent and Trademark Office; Search Report and Written Opinion in related International Patent Application No. PCT/US2021/56442 dated Jan. 21, 2022; 19 pages.

*Primary Examiner* — Xavier S Wong
(74) *Attorney, Agent, or Firm* — Wood Herron & Evans LLP

(57) ABSTRACT

A device and method for communicating between networked devices that define a path having a plurality of device positions includes designating a source device for a communication stream wherein the source device has a first port to communicate in a first direction of the path and a second port to communicate in a second direction in the path with devices networked to the source device. A port is selected from one of the first port or the second port of the source device for defining a direction of the communication stream from the source device. A hop count is provided indicating a relative location of a destination device for the communication stream, the hop count being an integer number of network device positions from the source device to the destination device along the path from the selected port.

16 Claims, 9 Drawing Sheets

(56) References Cited

U.S. PATENT DOCUMENTS

| | | |
|---|---|---|
| 8,645,509 B2 | 2/2014 | Carriere |
| 9,745,141 B2 | 8/2017 | Reischl |
| 9,819,639 B2 | 11/2017 | Van Den Wouwer |
| 10,091,164 B2 | 10/2018 | Mullin |
| 10,233,028 B2 | 3/2019 | Combs et al. |
| 2013/0191570 A1 | 7/2013 | Lee et al. |
| 2013/0219491 A1 | 8/2013 | Hall et al. |
| 2014/0092738 A1* | 4/2014 | Grandhi .................. H04L 45/22 370/235 |
| 2014/0277698 A1 | 9/2014 | Combs et al. |
| 2015/0078200 A1* | 3/2015 | Kalkunte ............ H04L 41/0806 370/254 |
| 2016/0099859 A1* | 4/2016 | Mohammadi ........... H04L 45/74 370/248 |
| 2018/0127217 A1 | 5/2018 | Henze |
| 2019/0036766 A1 | 1/2019 | Popov |
| 2019/0058652 A1* | 2/2019 | Camacho Villanueva .................. H04L 45/14 |
| 2020/0044984 A1* | 2/2020 | Huynh .................. G06F 16/953 |
| 2020/0277145 A1 | 9/2020 | Combs et al. |

\* cited by examiner

261

| CONNECTION TABLE | | |
|---|---|---|
| CONNECTION NAME | EGRESS PORT | HOPS |
| UPSTREAM | PORT 1 | 1 |
| DOWNSTREAM | PORT 2 | 1 |
| FULL PREDICT | | |

263

| CONNECTION TABLE | | |
|---|---|---|
| CONNECTION NAME | EGRESS PORT | HOPS |
| UPSTREAM | PORT 1 | 1 |
| DOWNSTREAM | PORT 2 | 1 |
| FULL PREDICT | PORT 2 | 5 |

265

| CONNECTION TABLE | | |
|---|---|---|
| CONNECTION NAME | EGRESS PORT | HOPS |
| UPSTREAM | PORT 1 | 1 |
| DOWNSTREAM | PORT 2 | 1 |
| FULL PREDICT | | |

267

| CONNECTION TABLE | | |
|---|---|---|
| CONNECTION NAME | EGRESS PORT | HOPS |
| UPSTREAM | PORT 1 | 1 |
| DOWNSTREAM | PORT 2 | 1 |
| FULL PREDICT | | |

269

| CONNECTION TABLE | | |
|---|---|---|
| CONNECTION NAME | EGRESS PORT | HOPS |
| UPSTREAM | PORT 1 | 1 |
| DOWNSTREAM | PORT 2 | 1 |
| FULL PREDICT | | |

271

| CONNECTION TABLE | | |
|---|---|---|
| CONNECTION NAME | EGRESS PORT | HOPS |
| UPSTREAM | PORT 1 | 1 |
| DOWNSTREAM | PORT 2 | 1 |
| FULL PREDICT | | |

273

| CONNECTION TABLE | | |
|---|---|---|
| CONNECTION NAME | EGRESS PORT | HOPS |
| UPSTREAM | PORT 1 | 1 |
| DOWNSTREAM | PORT 2 | 1 |
| FULL PREDICT | | |

FIG. 5A

SYSTEM AND METHOD FOR RELATIVE ADDRESSING BASED ON PHYSICAL TOPOLOGY

CROSS-REFERENCE TO RELATED APPLICATIONS

This application is a claims the benefit of priority to U.S. Provisional Patent Application Ser. No. 63/104,991, filed Oct. 23, 2020, the disclosure of which is incorporated by reference herein.

FIELD OF THE INVENTION

The invention is directed generally to the control and communications between elements of a networked system and particularly control and communications between elements based upon their location and layout within the overall system.

BACKGROUND OF THE INVENTION

In networked control systems that are used within a larger overall system, such as, for example, a conveyor system within a warehouse facility, various of the elements or nodes in the system rely upon different control connections for interfacing with each other. The control connections between the various elements may be distributed. That is, any node can open a connection to another node in the system. Alternatively, the control connections may be centralized wherein one node is controlling and opens control connections to some or all of the other nodes in the system. The set up and maintenance of such control connections is usually managed by a technician or system operator who can set the various connections and device or element addresses, such as Ethernet addresses or MAC addresses, in the system for proper communication.

The concept of proper addressing for the various nodes within a system becomes a particular issue when a node fails and needs to be replaced. Particularly, the other nodes that need to be connected to the replacement node need to be able to re-create their previous connection paths. This is generally only possible if the new node or element has the same element address as the old node or element that was replaced. Alternatively, the various other nodes' connections may be manually updated to reflect the new address of the new replacement node. Such replacement scenarios therefore usually have to be resolved by the system operator or technician. This takes time and is therefore costly, not only in system down time but also the time needed to address the issue. Such a replacement scenario also does not permit automatic address assignments, such as those used in DHCP protocols, because such connections cannot be set up without prior knowledge of every other node's address. Accordingly, maintaining the proper control connections in a network system of nodes can be tedious and often requires the attention of trained network operators/technicians whenever nodes and devices malfunction and must be replaced.

Many such control systems exist as larger overall factory systems, such as conveyor systems, that have redundant or duplicative machine elements or portions of the conveyor that will need to be managed and replaced over time. That is, it is common for a factory using conveyor systems to have multiple machines or sections that are duplicated and are of the same type. The duplicative elements are connected together within a larger common plant network. Those multiple machines may be composed of multiple control nodes. Since all of the various control nodes are connected to the same plant network, they must have unique network addresses.

For machine manufacturers, it is desirable to be able to create a redundant or duplicative machine system and associated networked elements and controls, and then to be able to replicate that system multiple times in a larger system. In initially creating the original single machine system, the process of assigning the various addresses to the various control nodes of the single machine is relatively straightforward. However, once a machine has to be replicated and those multiple machine systems have to each be connected to a common plant network, the duplicative scenario of that system creates various duplicate addresses on the network. Therefore, extra control and programming steps need to be taken to address the various duplicative addressing scenario when assembling a large system from duplicate elements. Such additional steps include having to manually configure every duplicate machine so that it has unique control node addresses in the larger network. Another solution is to never connect multiple of the duplicate machines to a common network.

None of these are various solutions are desirable for taking advantage of duplicate, similar machine systems to be assembled into a large system. First, the requirement to manually configure the systems to all have unique addresses is labor-intensive and requires constant attention to defective elements and replacement elements and nodes and repair scenarios. Secondly, having to keep machines and systems segregated on the network defeats the purpose of using duplicate networked elements and control nodes within a facility. Accordingly, there are still needs in the art for addressing the networking of machine systems and particularly the networking of machine systems that have various duplicative systems and sub-systems that are networked together.

SUMMARY OF THE INVENTION

A method, device and system for communicating between networked devices uses various devices that are referred to in a relative manner based on their location and the topology within the network. For a communication stream, a source device is designated wherein the source device has a first port and a second port for communication with devices networked to the source device. One of the first port or the second port of the source device is selected for defining a direction of the communication stream from the source device. Then a hop count is provided that indicates a relative location of a destination device for the communication stream. The hop count is an integer number of network device positions in the network from the source device to the destination device. In the start of the communication stream, network addresses of the networked devices coupled with each of the first port and the second port of the source device are obtained.

In determining the ultimate destination device for the communication stream, the invention progresses a single hop from the source device in the defined direction for the communication stream to another networked device. That next networked device is then designated as a new relative device for the communication stream. Then the network addresses for networked devices coupled with each of the first port and the second port of that new relative device are obtained and the hop count is decremented. The invention then iteratively progresses additional single hops in the defined direction of the communication stream and designates additional networked devices as new relative devices. The hop count is continually decremented for each step toward the destination device. When the hop count equals 1, the next additional networked device from the current relative device is designated as a destination device for the communication data stream and its address is used for network communications.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

FIG. 5A is a block diagram of connection tables for control elements of the conveyor system of FIG. 5.

Figure 1:
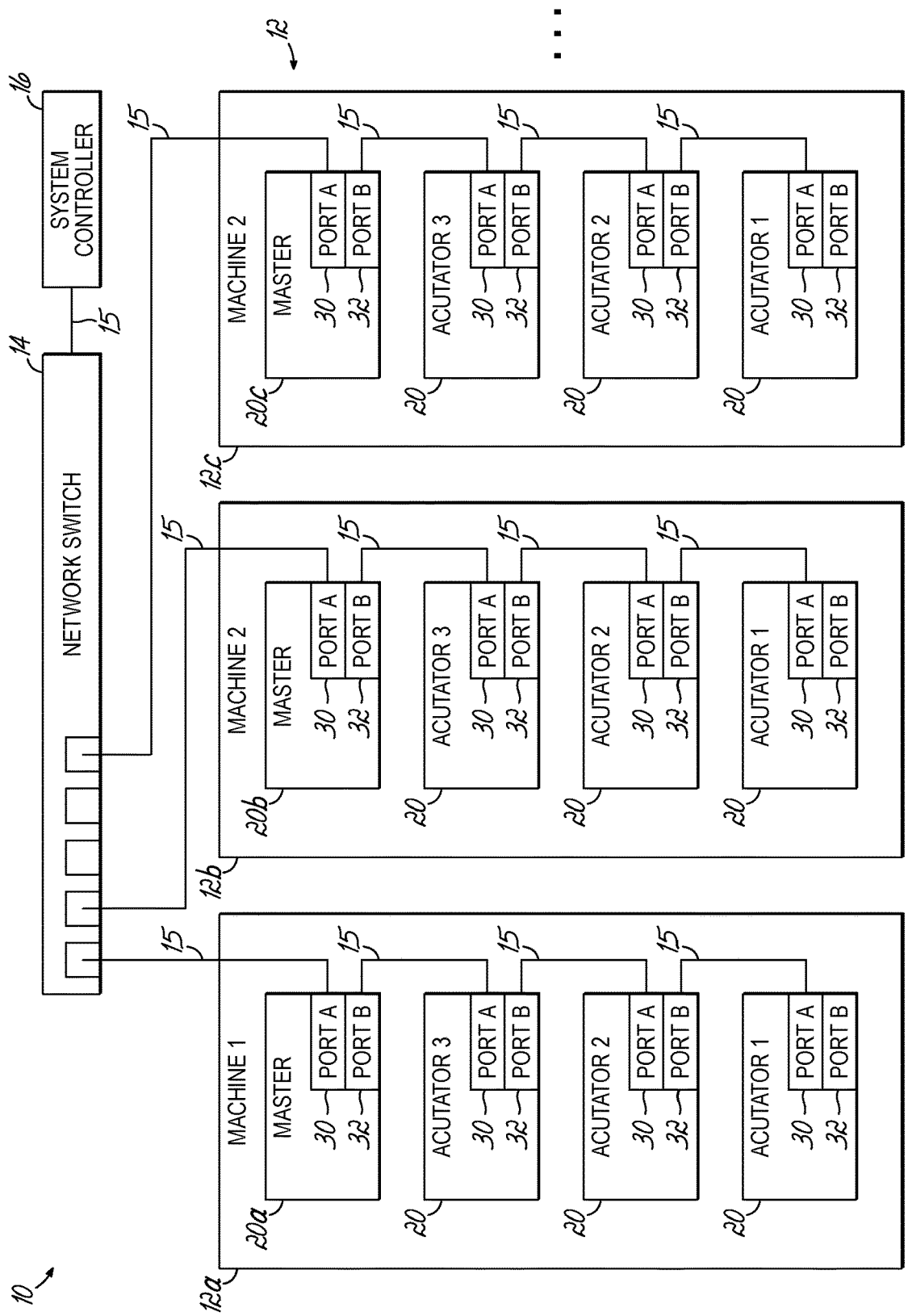
FIG. 1 is a block diagram of a networked system for practicing the system and method of relative addressing in accordance with one embodiment of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF EMBODIMENTS OF THE INVENTION

The present invention addresses drawbacks in the prior art by establishing a control system and methodology of providing a network connection among a plurality of devices in a network that have fixed addresses, such as fixed numerical Ethernet and MAC addresses, without requiring prior knowledge of the specific addresses of the devices that are involved. Rather, the various devices are referred to in a relative manner based on their location and the topology within the network. More specifically, the devices are referred to in a relative manner based upon the direction of the device or element in the network from another element in the network as well as the number of incremental steps or "hops" that each element is spaced in the network from another element in the network. The invention provides the ability to network various similar devices into a network without requiring the use of a unique numeric address for the device by providing addressing based on the predetermined location of the device in the overall network system relative to other devices. In that way, devices are addressed by their location relative to each other. If an element malfunctions and needs to be replaced, the relative addressing scheme of the invention ensures that it may be done with minimal reprogramming.

More specifically, in systems wherein control devices are networked together to control a single multi-axis or multi-mechanism machine, the utilization of historical addressing protocols for nodes on a point-to-multipoint network, may not be optimal. For example, the historical usage of unique addresses, pre-assigned names and pre-assigned numeric addresses, may be useful in general, but is not as useful in situations where the function of a device is predetermined by its actual physical location in a network. The relative addressing scheme of the present invention is particularly useful for multiple and duplicative network enabled devices that are configured to talk over an Ethernet network for the control of multi-axis or multi-mechanism machines. In such scenarios, multiple machines are connected to the same Ethernet network and may be arranged in a plurality of duplicative arrangements. Any device, such as a controller device, for a particular machine may need to communicate with any other device, such as another controller device, on the same machine. In still other scenarios, there may be a master device that is part of the machine and controls all other devices associated with the machine.

In one embodiment of the present invention, devices address other devices in the network by their physical location in the network relative to each other rather than by a unique name or unique numerical address. More specifically, the devices address their various communication targets, such as other network devices, by specifying a particular network egress or exit port from a source device and a particular number of hops or device steps that it takes to reach the target device within the network. The invention takes advantage of such duplicate systems having a linear network of devices where a particular device is coupled to a plurality of other devices that are located in a first network path or a second network path from the particular device. In one use scenario, such as in a conveyor system, the first and second paths might be physical paths that are considered upstream and downstream paths in the system for a particular device. That is, a source device may communicate with one or more upstream devices and one or more downstream devices. In that way, a particular direction of communication is defined based on the path and the communication progresses through a singular output port from a source device that can be designated the egress port for that particular path. The location of the target device, relative to the location of the source or initiating device, is that used for providing the number of location hops that are used from the egress port to the target device for providing desired the communication flow.

FIG. 1 illustrates one exemplary system for incorporating an embodiment of the invention. For example, the system 10 includes a plurality of machines 12, that are illustrated in FIG. 1 as 12a, 12b, 12c, etc. The machines 12 might be coupled together in the network of the larger system 10, such as through one or more network switches 14 or other network hardware that facilitates the communication between the various elements of the network, such as the various machines 12. One suitable switch element 14 might be a typical Ethernet switch, for example.

Each of the machines 12a, 12b, 12c etc may include various other network elements or devices 20, such as control devices or controllers that are used to control portions of the respective machines. One particular, but non-limiting, use for the present invention is in the control of a system of conveyor machines, that have plurality of different portions or sections that are each controlled by a respective control device 20. Such conveyor machines are often arranged end-to-end to form a conveyor line. The devices 20 are thus arranged in the machine in a generally linear fashion along the conveyor line. Each machine might include a respective "Master" device or actuator 20a, 20b, 20c that couples with one or more other slave devices or "actuators" 20 as illustrated in FIG. 1. The invention provides improvements in the communications between the various devices 20 of a machine 12a, 12b, 12c, etc.

In an example of the present invention, the master actuator 20b of machine 2 may need to communicate with or to read or get data from another device designated as "actuator 2" in that same machine 2. Traditionally, in existing systems, that communication connection would be opened by designating the name of the element or designating the associated IP address of the actual device that is considered as "actuator 2". However, as noted, such a path requires that the master device knows the specific name of the "actuator 2" device or knows its unique numerical IP address. However, when a device 20 within a machine 12 is defective or fails and gets replaced by another off-the-shelf unit, then a specific name or a specific numerical IP address will have to be assigned to the new replacement device that acts as the replacement for "actuator 2". Therefore, a human operator would then have to manually assign the original name/numerical address from the old, failed device to the new replacement device. Alternatively, if new names/numerical addresses are used for the replacement device, a human operator would then have to manually adjust/modify the software protocols or programs running on all the other devices of the system that would facilitate the connections with the old, failed device so that they would now target the new replacement device. As may be appreciated, such a process to address each replacement device in a large number of machines in a system or in a large number of devices on a machine can be time consuming, expensive and will require specific programming expertise by the facility housing the system 10. Various numerical addresses throughout the system have to be tracked using the present invention, the various devices, such as master device 20b will be able to connect to the new replacement device, such as actuator 2, with no human intervention or reprogramming, which would be impossible using classic network topology.

As described herein, rather than opening a connection to a particular named device 20 or an associated numerical IP address, the master device 20b opens a communication connection to the device 20 using a relative designation, such as "the second device connected on Port B" from the master device 20b. In that way, any device 20 can open a unique connection to any other device using the designation of a destination device as reflected by an egress port of the source device and the number of "hops" or locations for the destination devices from that egress port of the source device. With the invention, a machine 12 can be reproduced in normal production, and the machine 12 and all of the various devices 20, such as control modules for portions of the machine, can utilize the exact same program and network connection settings without interference. That is, since each device is accessed in a relative sense in each machine based on an egress port or direction of the communication from the source device and the relative number of location spots or hops from the source there is no interference created in the network due to duplicate names and/or duplicate numerical IP addresses.

For example, in a traditional networked system, if a manufacturer makes the same or duplicate machine consisting of, for example, at least one master device and a plurality of slave devices as shown in FIG. 1, those machines will each need to have unique numerical IP addresses for all of those devices 20 and the master device will need to be configured to talk to the unique numerical addresses of the slave devices. If those addresses between duplicate machines were also duplicated, and consequently multiple machines were plugged into the same network, there would be duplicate addresses which would not be an acceptable situation for the purposes of network communication.

In the present invention, addressing between the various devices is provided in the form of "X number hops past a particular egress port Y". Then, even if multiple identical machines are connected to the same ethernet switch 14, the connections of one machine 12 will not interfere with the connections of another machine, because each possible destination device will have a different location relative to a source device.

In accordance with one aspect of the invention, the devices of a particular machine are arranged in a linear communication arrangement as illustrated in FIG. 1 so that depending on the designated egress port of a source device, the direction of the communication is established. Furthermore, the system 10 must have knowledge of the routing of the ethernet cables that are documented from the time of production of the machines 12 and the routing needs to be consistent with how the connections are configured and located between the duplicative machines. This is generally the case as the wiring diagrams are usually an integral part of designing and manufacturing any machine.

In accordance with one feature of the invention, the system 10 runs programs for the management and operation of the various machines 12 and the overall system 10 based on location parameters for the various devices within the system. Specifically, the software of an operating system of the system controller 16 and the software of various control applications on the system controller 16 or the various devices 20 will set up a communication connection between one particular node or source (the initiation node or source device) and another adjacent node or source (the target node or destination device) based upon the particular device or node, the particular egress port for the initiation node, and the number of relative hops to the target node or destination device. The selected egress port will define the direction of a communication stream.

In accordance with one aspect of the invention, a particular device or node uses one or more network protocols and databases for obtaining information from each of the devices 20 of system 10 regarding the adjacent devices to which it is connected. As illustrated in FIG. 1, each device can have a particular egress Port A/B or as discussed further herein Port 1/2, depending on which direction the network communication stream will flow with respect to other devices in the system. That is, various devices of the network of system 10 may be connected to one or more other particular devices through port A for communication and may be connected to other different devices through Port B. The system 10, either through system controller 16 and/or through each device 20 is configured to collect data about the various adjacent devices in the system and to provide a database of that information to be used in the invention to establish suitable communications based on knowing the egress port to get to a particular destination device and how many relative hops to the location of the destination device from that egress port. No specific and set numerical ethernet address for the destination device or target node needs to be known by the source device or initiation node in the software code to facilitate communication between devices. In that way control programs for the various devices or nodes may be duplicated between each of the machines 12 without using specific numerical IP addresses or other network addresses. Therefore, the implementation of various machines on the same network, such as through the same ethernet switch, does not create interference due to duplicate numerical addresses. Still further, the various devices 20 can be readily replaced as needed without having to ensure that the replacement device has the same traditional numerical address as the old device and/or without having to modify various of the control programs on all the other devices 20 or the system controller 16 to reflect a new numerical address of the replacement device.

In accordance with one aspect of the invention, the system 10 needs to have information regarding each of the nodes 20 and their adjacent nodes 20 for use in the relative addressing program of the invention. The unique addressing and communication protocol of the invention then uses such information in implementing the relative addressing protocol of the invention as described herein. In one embodiment of the invention, the information is acquired using protocols designed for obtaining such information for use in other network protocols, such as an ethernet protocol. Such information is then stored in a suitable accessible database for the invention to use in the relative addressing methodologies disclosed herein.

In one embodiment of the invention, a Link Layer Discovery Protocol (LLDP) (IEEE 802.1AB) might be used and allows devices to collect and access data about other adjacent nodes or devices. Information that is gathered, such as with an LLDP protocol can be stored in the device management information database (MIB) and queried and obtained using the Simple Network Management Protocol (SNMP). The topology of an LLDP-enabled network can be discovered by moving around the hosts and querying the MIB database. With such a protocol each device 20 will be able to acquire the physical address, such as a Media Access Control address (MAC) and/or a logical address or internet protocol (IP) address of the direct neighbor devices on each port that it has.

In the current example, referring to FIG. 1, the devices 20 each include a pair of ports indicated at Port A, 30 and Port B, 32, that may act as egress or outbound ports for various communications in which the particular device is involved. Such egress ports are used in the relative addressing scheme of the invention. With this knowledge present in every device 20, that device can incrementally query a neighbor device for their own knowledge of their adjacent devices and consequently every device can create a suitable MIB database or tree describing the interconnection of every device on the entire network. The relative addressing of the present invention allows a programmer to duplicate programs and communication steps for each of the machines 20, for example, as shown in FIG. 1 and the program does not have to know or use the specific numerical MAC or IP address of the target device in a particular communication stream. Rather, all that needs to be specified in the control program is the initiating device or "relative node" and the particular path out of the initiating device or node or the "egress port" out of the device to define a direction for communication.

Then, the number of steps or "hops" to the destination device or node from the egress port is used. The invention uses that information, along with information obtained from an appropriate database, such as an MIB database, and the proper communication path and destination device is determined without the control program having a hard set numerical IP, MAC or other address for the destination device. Anytime any of the devices or nodes 20 are removed and replaced in the machine 12 or networked system 10, the communication program does not need to be modified and the new replacement device does not have to be given the same numerical IP, MAC address as the original. The invention is thus not limited to programs that must be reconfigured each time that a new device 20 is implemented into the networked system 10, such as a replacement device, or if the MAC addresses or IP addresses of various of the devices are changed. Control programs for a device do not have to incorporate a specific numerical address as a destination address. Rather, communications might be directed to whatever device is three hops or positions away from the source device.

Figure 2:
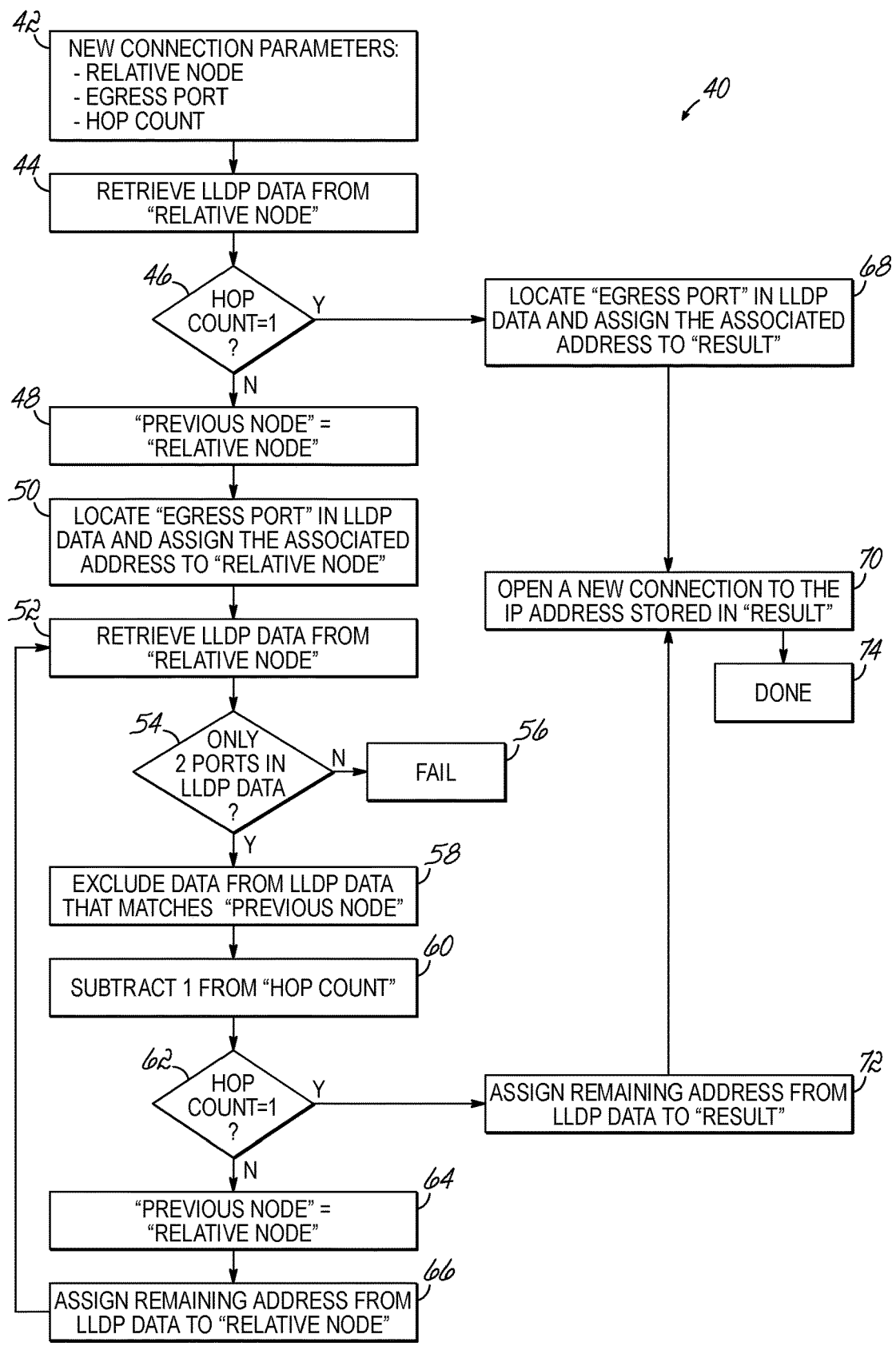
FIG. 2 is a flowchart of a relative addressing method and flow in accordance with one embodiment of the invention.

Referring to FIG. 2, a flow chart is set forth for one exemplary embodiment of the invention. For the networked system 10 as illustrated in FIG. 1, for a machine 12 like machine 12*a*, a program running on a device of the machine might need to open and carry-on communication with all the other devices or actuators. For example, the master device 20*a* might need to communicate with the device 20 designated as "Actuator 1". In the network database, such as an MIB database, the various devices 20 or nodes may have MAC numerical addresses as follows:

Master node—192.168.1.1
Actuator 3—192.168.1.2
Actuator 2—192.168.1.3
Actuator 1—192.168.1.4

For the purpose of communications in accordance with the invention, the program running on the device or Master node 20*a* would not address a destination device of Actuator 1 by the MAC numerical address but provides input parameters as follows for a communication path to the "Actuator 1" node with the Master node 20*a* (as source) being designated as the "Relative node". In the flow 40 of FIG. 2, at step 42, the connection parameters for the communication connection are set forth. The "Relative node" or the starting or source device can be any particular device in the system and may be set to any name, or MAC address or IP address.

"Relative node"=local (192.168.1.1)
"Egress port"=B
"Hop count"=3

The "Egress port" 30, 32 will designate the interface port chosen and this will designate the direction of the communication stream, such as a first path or a second path in the system 10 or for machine 20*a*. Depending on the layout of a system, such as a conveyor system, the direction might be considered upstream or downstream in the flow. In accordance with an embodiment of the invention, with the noted communication parameters in a program, the inventive algorithm first retrieves the local LLDP data, or other network data from a table or database (step 44). In the current example, the sample LLDP data for the source device that was retrieved might indicate the Port information for that source, such as the IP addresses for the devices connected to those particular ports 30, 32 in either of two directions to proceed from the source device:

Port A—192.168.77.88
Port B—192.168.1.2

The path to the "Actuator 1" device from the egress port B includes a "hop" count of 3 because of the relative location of the elements and so the Hop count is set at 3 at the initial starting step 42. A test of the hop count is made at step 46 and as long as there are further devices to hop in the communication (hop count >1), the main loop in the program flow is entered. Since the hop count of 3 is greater than 1, the process proceeds beyond the starting or source device node or relative node of Master node 20a and so the relative node or source device is past and so now is assigned as a previous node. That is, in step 48, the new relative node is made to be the device or node 20 of "Actuator 3" that is one hop away from port B and its IP address is then obtained for the device at the egress port B (step 50) in continuing down the flow chart and communication stream. The next device at the egress port B and the LLDP data is determined and used or assigned as the new relative node.

"Previous node"=192.168.1.1
"Relative node"=192.168.1.2

The algorithm then enters the main loop at step 52 and the data for the current relative node is obtained from the database of the LLDP data. Since that current relative mode is the "Actuator 3" device, the determined data for the Actuator 3 will show the previous Master device 20a at one port (which was the original source device) and the Actuator 2 device at the other port in the desired flow direction of the communication stream:

Port A—192.168.1.1
Port B—192.168.1.3

The inventive program requires only a first path or a second path to the target destination node for a proper amount of hops to the destination device and so a test is made at step 54 to ensure that such a binary condition exists for selecting only one path direction. If there are more than 2 ports and so more than first and second paths and respective ports, the program notes a failure condition at step 56. Since the initial relative node or source node of device 20a, the Master device, has been addressed previously, that address information is not needed and the data for the Port A device 20a gets excluded or deleted at step 58 because it matches "Previous node". In that way, the communication flow moves in the desired direction to the next node.

The "Hop count" then gets decremented by 1 at step 60, since one device or node has already been addressed. That is, the "Hop count" becomes 2 in the example. A test is again made at step 62 to determine if the hop count has been decremented to be equal to 1. If so, a flow path as discussed below is pursued. Further in the flow, the current "Relative node" now becomes the current "Previous node" as set forth in step 64. That is, the "Previous node", is now set to that of the "Actuator 3" device:

192.168.1.2

The remaining network data left from the LLDP data for the current "Relative node" or for the "Actuator 3" node is that address or device data next in the flow path and is from Port B (downstream port in FIG. 1) of the "Actuator 3" device. That information is the IP address for the next device in the flow path, which is the "Actuator 2" device:

Port B—192.168.1.3

That address information for the Actuator 2 device then gets assigned to be the new "Relative node" as set forth in step 66. The program then loops again in the main loop. At step 52, the new LLDP data or other network data retrieved, is for the current "Relative node" which is Actuator 2 or the device with IP address 192.168.1.3. That port address information that is obtained includes the devices and addresses associated with the various flow path ports A and B of the "Actuator 2" device:

Port A—192.168.1.2 (previous "Actuator 3")
Port B—192.168.1.4

Again, as in step 54, a determination is made to ensure that there are defined first and second paths and only two reflective possible egress ports or directions for the flow. The data for Port A, which is in a direction opposite to the hop progression communication stream flow would be deleted because it matches "Previous node" address data as noted in step 58. The hop count is again decremented by 1. At that point, "Hop count" would decrease to a value of 1. Then pursuant to the test made in the program flow at step 62, the outcome of "yes" would exit the loop and direct the flow to step 72. The flow has arrived at the destination device. The remaining address information from the Port B data from the LLDP database or table data that would reflect the location of Actuator 1 is designated as the "Result" for the destination node or device for the communication path. That remaining IP address is 192.168.1.4 as shown above which matches the IP address of the "Actuator 1" device, which is the ultimate destination device.

In the program flow, and the program code associated with the communication connections for Machine 1 as illustrated in FIG. 1, no specific numerical address or name information is utilized or needed in the code for designating a destination device. As such, the inventive communication protocol does not use or require specific numerical addresses in the program code for communication processes. Rather, from a destination device, you just indicate the direction you proceed in the network and the number of relative positions in that direction. The flow will arrive at the desired destination regardless of what actual numerical IP address or MAC address the destination device has. In essence, the program running on the Master device wanted to open a connection to a relative device that is 3 hops out of port B, and the inventive method opened a connection to the device with the IP address 192.168.1.4 which is the proper device. The "Actuator 3" device may have had a completely different IP address, such as through a replacement or through a dynamic change in addressing for the machine devices, and the invention would still have created a connection to the correct destination device using the relative addressing scheme of the invention. The Master device did not have to know the MAC or IP address of Actuator 3 as a destination. It only had to hop three positions in the path direction. Thus, the invention relieves the programmer that programs the devices and machines and other elements of the networked system 10, from having to have prior knowledge of all the IP addresses or other numerical addresses associated with a specific device that is in a particular location in the networked machine. The programmer would only have to know the device layouts of a machine, or sub-portion of a larger network, and if the machine or network portion is duplicated, would only have to have a single program using the relative addressing of the invention. To understand the location of the devices or nodes, the programmer can use the wiring diagram of the machine to define relative positions of the target devices of the communication connections that need to be opened.

The invention also works if the "Relative node" for initiating the communication is set to an arbitrary device Name or IP address from a node outside of a particular machine for example as used in the example. In this case the first retrieval of LLFP data would happen not from the local database or table, but from the device or node specified by "Relative node". To that end, the initiating "Relative node" can be a device name, IP address, MAC address, or any other addressing convention used on the network.

Similarly, the example discussed herein demonstrates "Relative node" and "Previous node" data as being populated in the flow with IP addresses. However, the invention can use other addressing schemes or identifiers as long as a node or device on the network can use that identifier to connect to a remote node or device that has been assigned this identifier. As such, the information retrieved from the MIB database, in the implementation of the invention, may vary. But regardless of what ultimate IP or MAC address a destination device has, it will always occupy the same relative position as designated by hops from the source. So if a replacement device is put into a system, it can have a different IP or MAC or other address.

One particular benefit of the relative addressing scheme of the invention is that there can be multiples of a particular networked system or subsystem, such as a machine 12, that are connected to the same network. The program running on the various devices 20 for the machine 12 can be exactly the same on every machine. There can be true duplication. If there are multiple machines of type "Machine 1" 20a within a networked system 10, the respective devices, nodes or other modules would have unique IP addresses that traditionally would have to be programmed into the programs running on the machine. Replacement of any such device or node would then require reprogramming based on the different numerical IP address or other address for the replacement element. Even more beneficial is that the present invention also addresses those machine or system scenarios wherein addresses may be changing over time due to dynamic addressing schemes like DHCP. In such cases, the programmer creating the programs running on the Master node of every machine would have a very hard time setting up the connections from every Master node, to the respective actuator nodes. All of the programming effort would have to be done again if the addresses of all modules were to change dynamically.

The present invention addresses those issues by allowing the programmer to specify the various communication connections between the machines and devices not by name or by numerical addresses such as IP addresses or MAC addresses, but by relative location of an element on a path or direction in the network relative to another element. This provides a consistent result regardless of how many machines are connected to the network and regardless of how the names or addresses of the node elements may change. Normally, when an IP address changes, the existing connection would be broken. But the inventive method can be repeated to increment hops and locate the new addresses of devices and create new connections automatically based on relative steps without the programmer having to reconfigure or edit the program with the new device numerical address.

Figure 4A:
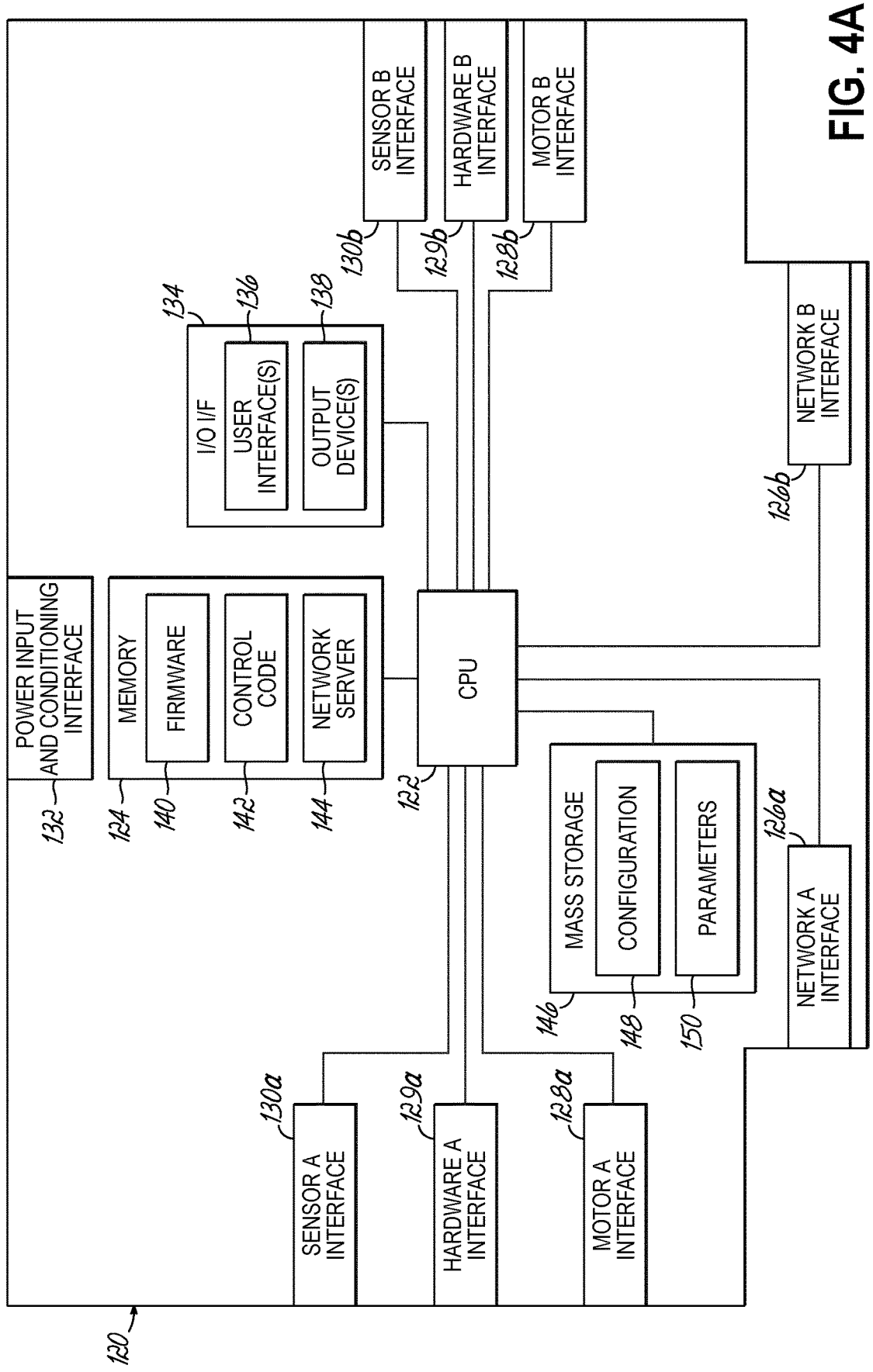
FIG. 4A is a block diagram of an embodiment of a networked device as used in the system as illustrated in FIG. 1.
Figure 4B:
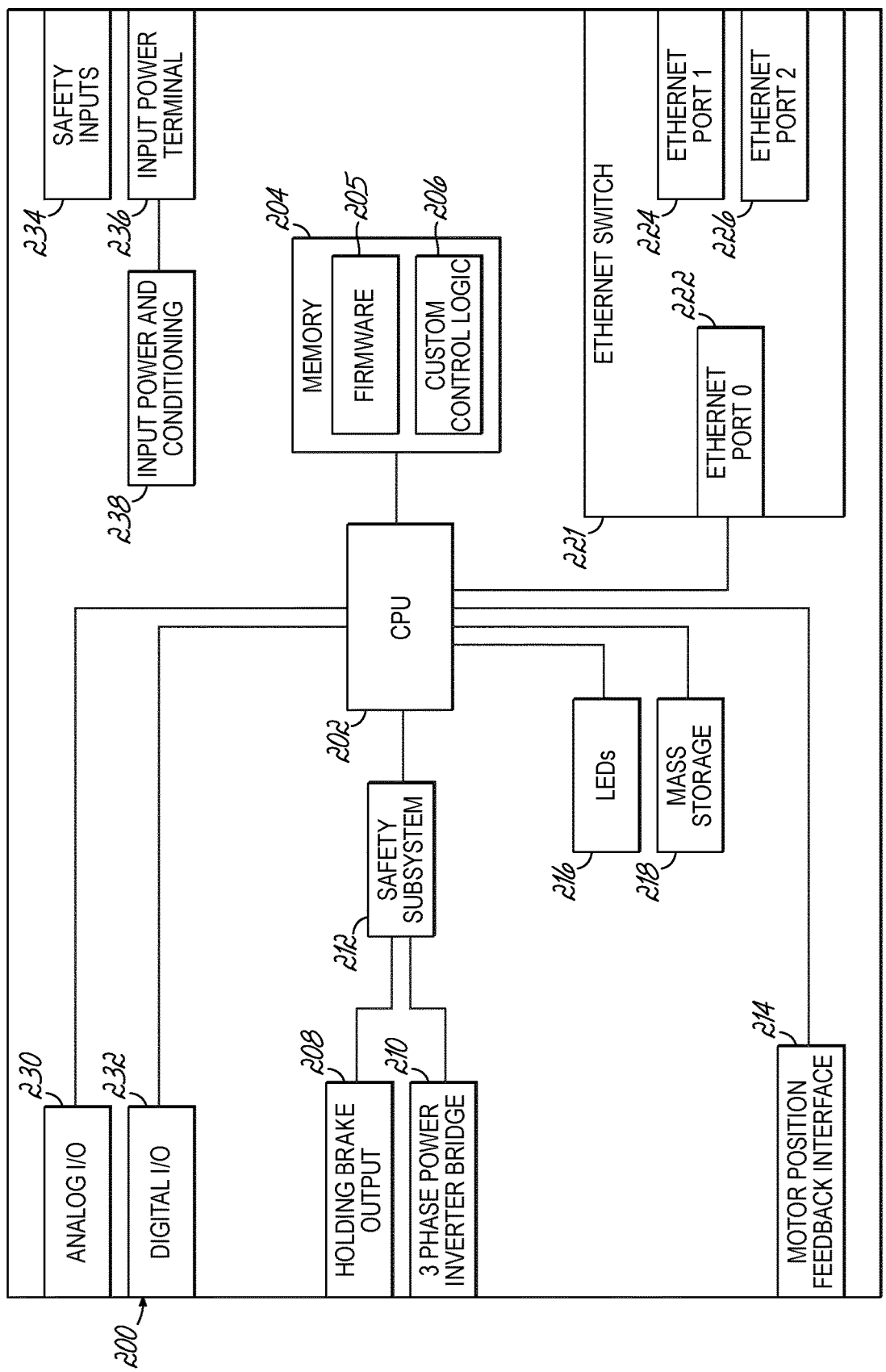
FIG. 4B is a block diagram of another embodiment of a networked device as used in the system as illustrated in FIG. 1.

FIGS. 4A and 4B illustrate diagrammatic illustrations of a hardware and software environments of an exemplary device similar to devices 20, such as controller 120, 200 that might be used in a machine like the machines 12, such as a conveyor machine or system, consistent with embodiments of the invention. The various controllers might be addressed in a relative addressing method as disclosed herein as one or more nodes in a networked machine 12. As such, while the controller elements 120, 200 as shown in the figures may be used to implement the invention, they are not limiting at to the other environments and processing or controller elements that can take advantage of the invention.

Turning to FIG. 4A, the controller 120, such as for a conveyor element includes at least one central processing unit ("CPU") 122 coupled to a memory 124. Each CPU 122 is typically implemented in hardware using circuit logic disposed in one or more physical integrated circuit devices, or chips, and may be comprised of one or more microprocessors, micro-controllers, field programmable gate arrays ("FPGAs"), or ASICs. Memory 124 may include random access memory ("RAM"), dynamic random access memory ("DRAM"), static random access memory ("SRAM"), flash memory, electronically erasable programmable read-only memory ("EEPROM") and/or another digital storage medium, and is also typically implemented using circuit logic disposed on one or more physical integrated circuit devices, or chips. As such, memory 124 may be considered to include memory storage physically located elsewhere in the controller 12, e.g., any cache memory in a CPU 122, as well as any storage capacity used as a virtual memory, e.g., as stored on a computing system 90 (FIG. 3) or another controller coupled to the controller 120 through at least one network interface 126a, 126b (illustrated as "Network A Interface" 126a and "Network B Interface 126b). The network interfaces are reflective, for example, of the Port A 30 and Port B 32 as discussed herein with respect to FIG. 1.

The controller 120 is configured to couple to the various devices to be controlled in a machine, such as conveyor rollers or other mechanisms (not shown), for example. The controller might be coupled to up to two motorized rollers or other motor elements through respective motor interfaces 128a, 128b (illustrated as "Motor A Interface" 128a and "Motor B Interface" 128b). In particular, the CPU 122 is configured to control the motorized rollers by selectively providing power to the motors as well as determining the rotational state of the motorized rollers. For example, for motorized conveyor rollers, each motor interface 128a, 128b allows the CPU 122 to provide power to and determine information about a motor of a motorized roller 18. In particular, the motor interface 128a, 128b may be generally utilized for brushless DC ("BLDC") motor commutation control to control the rotational speed of a motor in a motorized roller, in one example. More specifically, the motor interface 128a, 128b includes the ability to selectively energize particular windings of a motor connected thereto to turn a motorized roller, sense the current consumed by the motor connected thereto, and detect the rotational state of the motor connected thereto. The motor interface 128a, 128b may also include the ability to control a brake (not shown) associated with the roller.

In addition to the control of elements such as motorized rollers the CPU 122 might be configured to couple to other elements, such as up to two sensors (not shown), such as through respective sensor interfaces 130a, 130b (illustrated as "Sensor A Interface" 130a and "Sensor B Interface" 130b). The controller 120 might also be configured to couple to additional pieces of additional hardware (not shown) through respective hardware interfaces 129a, 129b (illustrated as "Hardware A Interface" 129a and "Hardware B Interface" 129b). The controller 120 is configured to receive power from a suitable power supply unit through a power input and conditioning interface 132.

The CPU 122 is further configured to receive input from a user and/or provide a human-perceptible output to a user through an input/output device interface 134 (illustrated and referred to hereinafter as "I/O I/F" 134). In some embodiments, the I/O I/F 134 is configured to receive data from the user through at least one user interface 136 (including, for example, one or more softkeys, a keyboard, mouse, a microphone, and/or other user interface), and/or provide a human-perceptible output to the user through at least one output device 138 (including, for example, one or more LEDs providing specific information, a display, speakers, a printer, and/or another output device). In some embodiments, the I/O I/F 134 communicates with a device that is operative as a user interface 136 and output device 138 in combination, such as a touch screen display (not shown). In specific embodiments, the at least one user interface 136 includes a softkey that, upon an actuation lasting a first predetermined amount of time, allows the CPU 122 to determine that the user desires to automatically configure a plurality of controllers 120, and, upon an actuation lasting a second predetermined amount of time, allows the CPU 122 to determine that the user desires to reset the controller 120. In further specific embodiments, the at least one output device 138 includes a plurality of LEDs that indicate, respectively, network connectivity through the network interfaces 126a, 126b, network traffic through the network interfaces 126a, 126b, a status of a network to which the controller 120 is connected, a status of one or more respective motors of respective motorized rollers connected to the motor interfaces 128a, 128b, a status of one or more respective sensors connected to the sensor interfaces 130a, 130b, a status of one or more respective pieces of hardware connected to the hardware interfaces 129a, 129b, a status of power to the controller and/or a status of the controller.

The controller 120 is typically under the control of firmware 140 as well as an operating system, application, and/or other program code configured to control the controller 120 (illustrated and referred to hereinafter as "Control Code") 142. As such, the controller 120 executes or otherwise relies upon various computer software applications, sequences of operations, components, programs, files, objects, modules, etc., consistent with embodiments of the invention. In specific embodiments, the firmware 140 includes data to control the components of the controller 12 while the control code 142 is executed to perform various operations consistent with embodiments of the invention. The controller 120 also includes a network server 144, which may include a web server and/or a DHCP server. As such, the network server 144 allows a separate computing system 90 (FIG. 3) to directly access information from the controller 12 through a network 82 (FIG. 3) and/or allows the separate computing system 90 to be directly connected to the controller 120 to automatically configure a TCP/IP connection therewith.

The controller 120 is also configured with a mass storage device 146 that may store data for to operate the controller 120 or other controllers 120 that are coupled together similar to the devices 20 in FIG. 1. In specific embodiments, the mass storage device 146 includes the configuration data of the controller 120 as well as the configuration data for adjacent controllers 120 in a configuration data structure 148. The mass storage may also store parameters for operation, such as its IP address, subnet mask, gateway, and other data structures, such as lists or lookup tables, that may be used to in the configuration and/or operation of the controller 120 and the use of the relative addressing method of the invention. The parameters may be stored in a parameters data structure 150.

Figure 3:
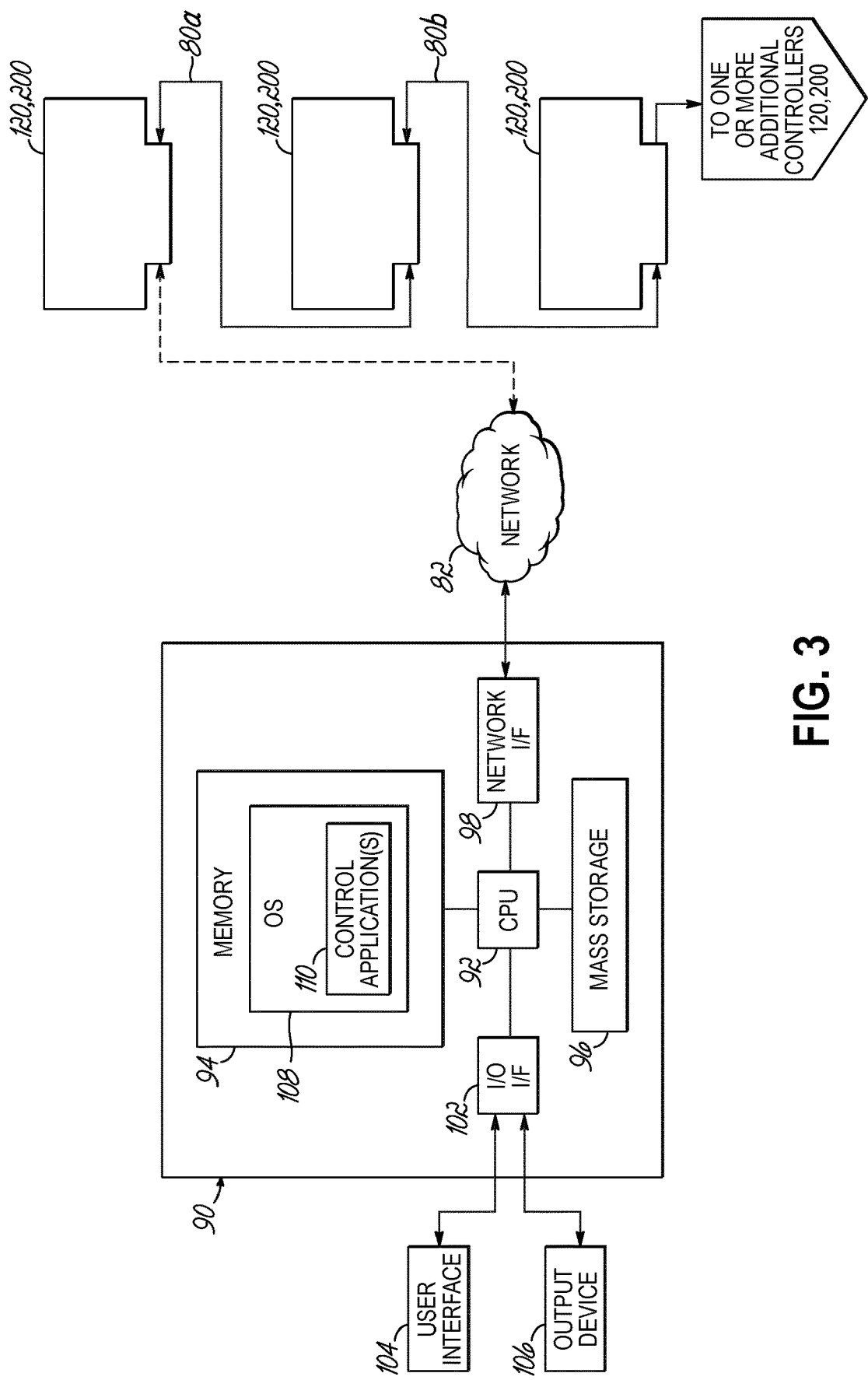
FIG. 3 is a block diagram of an embodiment of a system controller for a system as illustrated in FIG. 1.

The controller 120 may be configured to operate alone or in conjunction with at least one additional controller 120. Moreover, the controller 120 may be configured to be controlled externally, such as with the aforementioned computing system 90 or the system controller 16 as shown in FIG. 1. As such, and consistent with embodiments of the invention, FIG. 3 is a diagrammatic illustration showing interconnection between a plurality of controllers 120 via communication links 80a-b, such as ethernet cables, as well as the connection of one or more controllers 120 to at least one network 82 for control thereby with a computing system 90. In specific embodiments, each communication link 80 between controllers 120 is achieved through a network cable, such as a Category 5 cable used for Ethernet network communications. Similar to the devices 20 and the Master device and other actuators as shown in FIG. 1, a controller 120 may be configured to communicate with separate other controllers 120, directly (e.g., a Master device to Actuator 3) or indirectly (e.g., a Master device to Actuator 1) such as using the relative addressing protocol and a series of hops as described herein in accordance with one embodiment of the invention.

Turning to FIG. 4B, another exemplary device for implementing the invention is in the form of a controller 200, such as for a conveyor element. The controller 200 includes at least one central processing unit ("CPU") 202 coupled to a memory 204. Each CPU 202 is typically implemented in hardware using circuit logic disposed in one or more physical integrated circuit devices, or chips, and may be comprised of one or more microprocessors, micro-controllers, field programmable gate arrays ("FPGAs"), or ASICs. Memory 204 may include random access memory ("RAM"), dynamic random access memory ("DRAM"), static random access memory ("SRAM"), flash memory, electronically erasable programmable read-only memory ("EEPROM") and/or another digital storage medium, and is also typically implemented using circuit logic disposed on one or more physical integrated circuit devices, or chips. As such, memory 204 may be considered to include memory storage physically located elsewhere in the controller 200, e.g., any cache memory in a CPU 202, as well as any storage capacity used as a virtual memory, e.g., as stored on a computing system 90 (FIG. 3) or another controller coupled to the controller 200 through at least one ethernet port 224, 226 or other network interface (illustrated as "Ethernet Port 1" 224 and "Ethernet Port 2" 226). The Ethernet ports are reflective, for example, of the Port A 30 and Port B 32 as discussed herein with respect to FIG. 1 or of Port 1 and Port 2 of FIG. 5 as disclosed herein.

Figure 5:
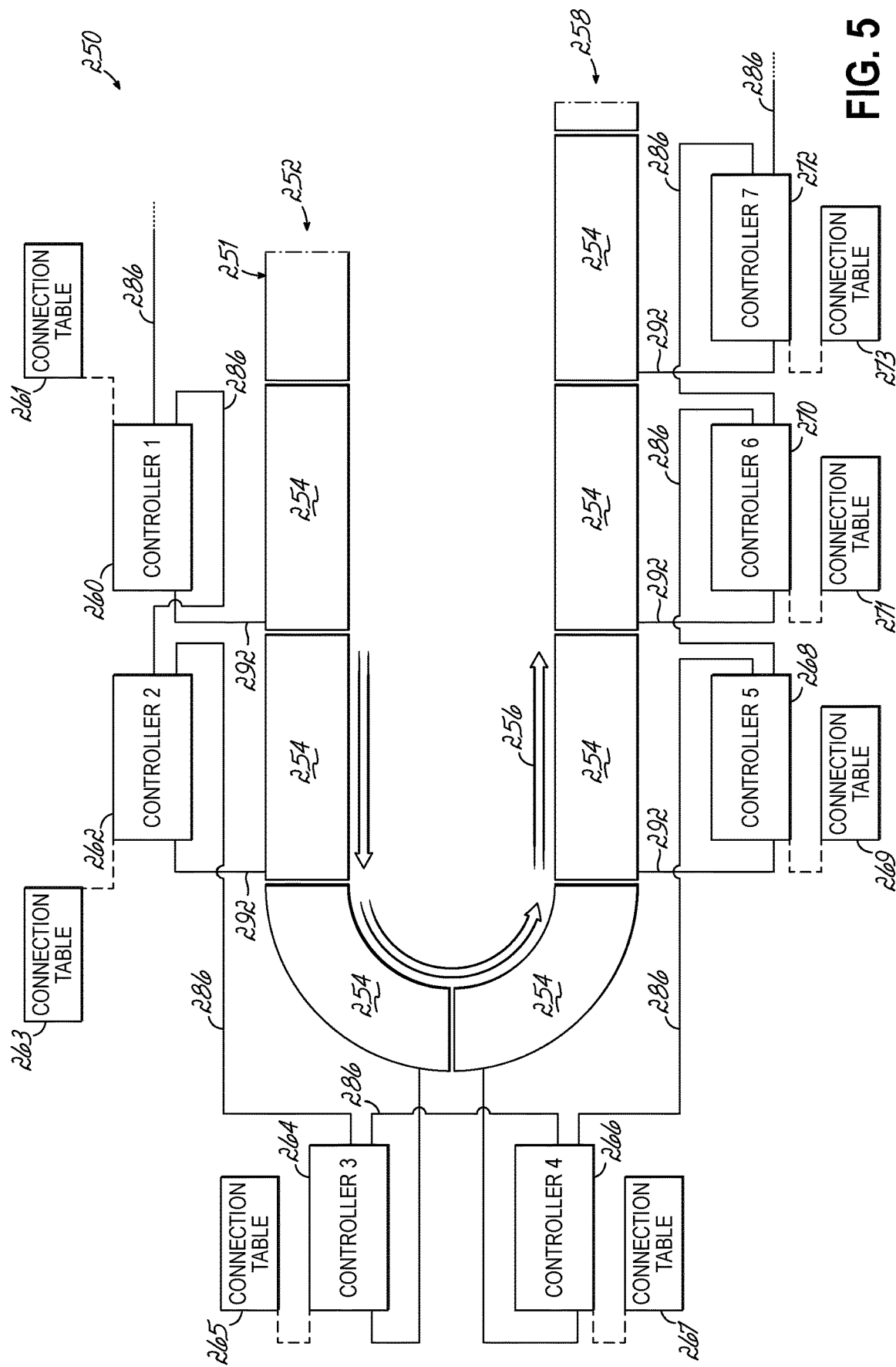
FIG. 5 is a block diagram of an exemplary conveyor system implementing an embodiment of the invention.

The controller 200 is configured to couple to the various devices to be controlled in a machine, such as a conveyor (see FIG. 5, for example). The controller might be coupled to a motorized portion of a conveyor, such as a conveyor roller through a three phase power inverter bridge 210 for providing power to a respective motor. The controller 200 might also provide braking control for the motor through a brake output 208, with each of the power 210 and braking 208 outputs controlled by a safety subsystem 212. In particular, the CPU 202 is configured to control the motorized rollers by selectively providing power to the motors as well as determining the rotational state of the motorized rollers, such as through a motor position interface 214. More specifically, the controller provides the ability to selectively energize particular windings of a motor connected thereto to turn a motorized roller, sense the current consumed by the motor connected thereto, and detect the rotational state of the motor connected thereto.

In addition to the control of elements such as motorized rollers the CPU 202 might be configured to couple to other elements, such as up to two sensors and additional hardware (not shown) through respective analog I/O interfaces 230 and digital I/O interfaces 232. The controller 120 is configured to receive power from a suitable power supply unit through a power input interface 236 that couples with a sufficient power conditioning circuit 238. Various safety inputs might also be provided to the controller 200 through interface 234.

The CPU 122 is further configured to receive input from a user and/or provide a human-perceptible output to a user through the interfaces 230, 232. In specific embodiments, the interfaces might include a softkey that, upon an actuation lasting a first predetermined amount of time, allows the CPU 202 to determine that the user desires to automatically configure a plurality of controllers 200, and, upon an actuation lasting a second predetermined amount of time, allows the CPU 202 to determine that the user desires to reset the controller 200. The controller 200 may also include one or more LED's for output to a user that indicate, respectively, network connectivity through the network ports, network traffic through the network ports, a status of a network to which the controller 200 is connected, a status of one or more respective motors of respective motorized rollers connected to the motor interfaces 208, 210, a status of one or more respective sensors connected to the controller, a status of one or more respective pieces of hardware connected to the controller, a status of power to the controller, and/or a status of the controller.

The controller 200 is typically under the control of firmware 205 as well as an operating system, application, and/or other program code or control logic 206 configured to control the controller. As such, the controller 200 executes or otherwise relies upon various computer software applications, sequences of operations, components, programs, files, objects, modules, etc., consistent with embodiments of the invention. In specific embodiments, the firmware 205 includes data to control the components of the controller 12 while the control logic 206 is executed to perform various operations consistent with embodiments of the invention. The controller 120 is also configured with a mass storage device 218 that may store data for to operate the controller 200 or other controllers 200 that are coupled together similar to the devices 20 in FIG. 1. In specific embodiments, the mass storage device 146 includes the configuration data of the controller 120 as well as the configuration data for adjacent controllers 120 in a configuration data structure. The mass storage may also store parameters for operation, such as its IP address, subnet mask, gateway, and other data structures, such as lists or lookup tables, that may be used to in the configuration and/or operation of the controller 200 and the use of the relative addressing method of the invention.

The controller 200 may be configured to operate alone or in conjunction with at least one additional controller 200. Moreover, the controller 200 may be configured to controlled externally, such as with the aforementioned computing system 90 or the system controller 16 as shown in FIG. 1. As such, and consistent with embodiments of the invention, FIG. 3 is a diagrammatic illustration showing interconnection between a plurality of controllers 200 via communication links 80a-b, such as ethernet cables, as well as the connection of one or more controllers 200 to at least one network 82 for control thereby with a computing system 90. In specific embodiments, each communication link 80 between controllers 120 is achieved through a network cable, such as a Category 5 cable used for Ethernet network communications coupled to the various ports 224, 226 of the controller. The network port of the actual controller 222 is considered to be Port 0. The various Ethernet or other network ports 0, 1 and 2 may be part of an Ethernet switch 221. Similar to the devices 20 and the Master device and other actuators as shown in FIG. 1, a controller 200 may be configured to communicate with separate other controllers 200, directly (e.g., a Master device to Actuator 3) or indirectly (e.g., a Master device to Actuator 1) such as using the relative addressing and a series of hops as described herein with a port, such as Port 1 or Port 2 designated as an egress port.

As discussed above, the various machines 12, such as portions of a conveyor system, may include a system controller 16 or computing system 90 operable to control the devices 12 or controllers 120 and thus the operation of the larger system 10. (See FIG. 3.) The computing system 90 includes at least CPU 92 coupled to a memory 94. Each CPU 92 is typically implemented in hardware using circuit logic disposed on one or more physical integrated circuit devices or chips and may be one or more microprocessors, microcontrollers, FPGAs, or ASICs. Memory 94 may include RAM, DRAM, SRAM, flash memory, and/or another digital storage medium, and also typically implemented using circuit logic disposed on one or more physical integrated circuit devices, or chips. As such, memory 94 may be considered to include memory storage physically located elsewhere in the computing system 90, e.g., any cache memory in the at least one CPU 92, as well as any storage capacity used as a virtual memory, e.g., as stored on a mass storage device 96, another computing system (not shown), a network storage device (e.g., a tape drive) (not shown), or another network device (not shown) coupled to the computing system 90 through at least one network interface 98 (illustrated and referred to hereinafter as "network I/F" 98) by way of the at least one network 82. The network I/F 90 may be connected to the network 92 wirelessly (e.g., through one of the numerous IEEE 802 standards) or through a hard-wire link (e.g., an Ethernet cable). It will be appreciated that the at least one network 82 may include at least one private communications network (e.g., such as an intranet) and/or at least one public communications network (e.g., such as the Internet).

As such, the computing system 90, in specific embodiments, is a computer, computer system, computing device, server, disk array, or programmable device such as a multi-user computer, a single-user computer, a handheld computing device, a networked device (including a computer in a cluster configuration), a mobile telecommunications device, a telecommunications capable device, a video game console (or other gaming system), etc.

The computing system 90 is coupled to at least one peripheral device through an input/output device interface 102 (illustrated as, and hereinafter, "I/O I/F" 102). In particular, the computing system 90 receives data from a user through at least one user interface 104 (including, for example, a keyboard, mouse, a microphone, and/or other user interface) and/or outputs data to the user through at least one output device 106 (including, for example, a display, speakers, a printer, and/or another output device). Moreover, in some embodiments, the I/O I/F 102 communicates with a device that is operative as a user interface 104 and output device 106 in combination, such as a touch screen display (not shown).

The computing system 90 is typically under the control of an operating system 108 and executes or otherwise relies upon various computer software applications, sequences of operations, components, programs, files, objects, modules, etc., consistent with embodiments of the invention. In specific embodiments, the computing system 90 executes or otherwise relies on a control application 110 to manage the operation of the controllers 120, 200 and the system 10.

Consistent with embodiments of the invention, a controller 120, 200 may be configured to operate in an autonomous fashion, a collectively autonomous fashion, or a dependent fashion. When operating in an autonomous fashion, the controller 120, 200 is not controlled by the computing system 90 and operates without any concern to one or more controllers 120, 200 located in a particular path from an initiating controller. As such, the controller 120, 200 simply controls a portion of the machine 12 without regard to additional controllers 12. When operating in a collective fashion, multiple controllers 120 are configured to share information upstream and/or downstream, but are not otherwise controlled by the computing system 90. Such controllers may communicate with each other using the noted relative addressing methods described herein. When operating in a dependent fashion, one or more controllers 120, 200 are configured to be controlled by the computing system 90. In the dependent fashion as well, communications to the various controllers might be done using the relative addressing methods described herein.

In any event, the controllers 120, 200 include a number of operations, operational modes, and functions that assist in the machine operation. For example, a controller 120, 200 is configured to automatically determine information about the machine 12 to which it is connected, and more particularly information about the components of the machine, and/or additional hardware configured thereupon. The controllers 12, in turn, control parts of the machine, such a rollers of a conveyor system.

Multiple controllers 120, 200 networked together (such as in a conveyor system) may automatically configure themselves when configured in an uninterrupted path of one or larger machines or assemblies. This arrangement is more commonly referred to as a "linear" arrangement as shown in FIG. 1. As such, the controllers 120, 200 or other devices 20 are configured along the linear machine and interconnected via communication links 80, 15.

The controllers 120, 200 communicate with each other through the communications links 80, 15 to access information about the machine or portions of a machine and controllers 120, 200 that are located in first or second paths along the system to dynamically adjust the operation of the machines and the overall system 10. The controllers 120, 200 may also store configuration of each controller 120, 200 to which they are adjacent. For example, when a machine 12 includes a plurality of controllers of devices, the first controller or device (e.g., the initial device in a path, such as the Master device) stores its configuration data and the configuration data of the second controller 120, 200, such as Actuator 3 (see FIG. 1), the second controller 120, 200 then stores its configuration data and the configuration data of the first controller 120, 200 (Master device) and third controller 120, 200, such as Actuator 2 (if present), and so-on with the last controller 120, 200 storing its configuration data and the configuration data of the next-to-last controller 120, 200. As such, when a controller 12 is removed, the replacement controller 12 may automatically access appropriate stored configuration data in an adjacent controller 120, 200. Furthermore, the replaced controller may be communicated with by the other controllers using the inventive method even if the controller has a different numerical IP or MAC address without having to reprogram the controllers or computing system 90. The controllers 120, 200 in one embodiment may use UDP for transferring configuration data, Modbus TCP for controller-to-controller communication, and Ethernet/IP for other communications.

A person having ordinary skill in the art will recognize that the environments illustrated in FIGS. 1-6 are not intended to limit the scope of embodiments of the invention. In particular, system 10, machines 12, devices 20 and controllers 120, 200 and/or system controller 16 or computing system 90 may include fewer or additional components consistent with alternative embodiments of the invention. Indeed, a person having skill in the art will recognize that other alternative hardware and/or software environments may be used without departing from the scope of the invention. Additionally, a person having ordinary skill in the art will appreciate that the various devices or controllers and/or system controllers or computing systems may include more or fewer applications configured therein. As such, other alternative hardware and software environments may be used without departing from the scope of embodiments of the invention.

The routines executed to implement the embodiments of the invention, whether implemented as part of an operating system or a specific application, component, program, object, module or sequence of instructions executed by one or more devices/controllers and/or control systems/computing systems will be referred to herein as a "sequence of operations," a "program product," or, more simply, "program code." The program code typically comprises one or more instructions that are resident at various times in various memory and storage devices in a controller and/or computing system, and that, when read and executed by one or more CPUs and/or of the respective controllers and/or computing system, cause that controller and/or computing system to perform the steps necessary to execute steps, elements, and/or blocks embodying the various aspects of the invention.

Figure 5B:
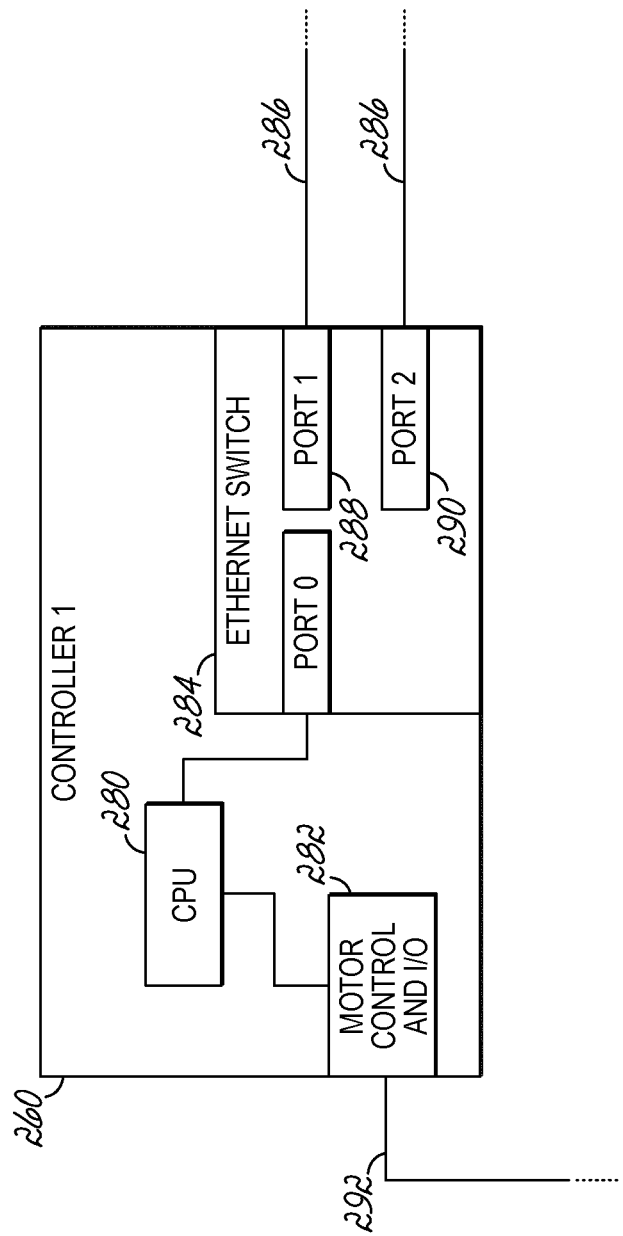
FIG. 5B is a block diagram of an exemplary controller element as used in the conveyor system of FIG. 5.

FIGS. 5, 5A, 5B and 6 set forth an exemplary system 250 using the relative addressing of the invention in a setting involving a conveyor machine 251 that includes a plurality of conveyor sections 254 that couple an upstream end 252 with a downstream end 258 as reflected by the directional flow 256 of the conveyor. Each conveyor section 254 is coupled with a respective controller 260, 262, 264, 266, 268, 270, 272 that will control the section and the operation of any motorized rollers or other elements therein, for example. In the illustrated example, addressing in accordance with the invention is used to control the flow of items or product on the conveyor 251 and to determine or predict a FULL condition at certain sections and stop the flow of product. FIG. 5B illustrates and exemplary controller 260 and elements for illustrating an example of the relative addressing feature in a conveyor environment.

Each controller communicates directly with an upstream or downstream controller, as shown in the respective connection tables 261, 263, 265, 267, 269, 271, 273 as illustrated in FIG. 5A for the controllers 1-17 as shown in FIG. 5. Each connection table is affiliated with each controller that uses the relative addressing scheme of the invention. To that end, the connection tables indicate that duplication may be used for the controllers to provide a connection to certain upstream or downstream elements through an indication of the egress port and the number of hops to the destination element.

As shown in FIG. 5B, the controllers include control circuitry such as a CPU 280 and Motor control and I/O circuitry 282. Each controller also includes a network switch, such as an Ethernet switch 288, with a plurality of ports Port 1, Port 2 288, 290. Each of the controllers is coupled to other controllers or elements of the system 250 through links 286 and is coupled to respective sections of the conveyor, through links 292. (See FIG. 5).

For example, in conveyor systems, it is often desired for the conveyor controllers to be able to exchange status information between themselves to help facilitate the motion of product down the conveyor line. In those cases, every controller needs to establish a connection to one or more controllers preceding it (the upstream side) and one or more controllers that follow it (the downstream side). For communications with an upstream controller, each controller proceeds through egress Port 1 and one or more hops, as shown in the UPSTREAM connection of the connection tables of FIG. 5A. Similarly, for connection to just the downstream controller, each controller proceeds through Port 2 and one or more hops, as shown in the DOWNSTREAM connection of the connection tables. While the example of FIG. 5A illustrates connection to adjacent controllers with one hop, other communication applications may require one or more controllers to communicate with controllers or elements that are further along the conveyor 251 and so employ multiple hops. The information passed over these connections allows the controllers to know what every one of them is doing. The example as discussed with respect to FIGS. 5, 5A, 5B and 6 represents one such distributed control system where the controllers autonomously convey product down the line. The conveying logic that every controller runs can and usually is identical in each controller.

The programmer only needs to write one program and then send it to all controllers. In practice, however, there is a hurdle that needs to be overcome. Even though the control logic program can be identical in all controllers, the connections that represent "upstream" and "downstream" must be unique. Using relative addressing, all programs and connection tables can be the same. Having identical programs and connection settings drastically reduces the time in which such a system can be assembled and commissioned.

In conveyor systems as shown in FIG. 5, there are sometimes unique requirements for product handling for certain controllers. One example of such a requirement is to not allow product to stop on a curved section or on a section that can temporarily get removed or lifted up, such as one involving a lift gate. In such cases, it is common that one controller A needs information from a controller B that is not immediately adjacent or connected to the controller A. So, the upstream and downstream connections as illustrated in the connection tables with 1 hop may not be sufficient for such a task as the controller needs to communicate to another controller further upstream or downstream. However, the relative addressing of the invention can be used to an advantage in such scenarios. In the depicted example of FIG. 5, there is a requirement that product cannot stop on the curved sections of conveyor 251. For example, the product cannot stop on the sections 254 affiliated with controllers 3, 4 (controllers 264, 266). This is accomplished by configuring a "Full Predict" application and functionality and respective connection on the controller 262 indicated as controller 2.

Again, the programmer does not need to know the actual addresses of the various upstream or downstream controllers to setup this connection. The relative addressing of the invention is convenient and lends itself well to repetition in a conveyor system or other system multiple times without changing the programs or settings. As illustrated in FIG. 5A, the "Full Predict" connection is configured in the connection table 263 of the controller 262 to connect to a controller that is "5 hops away on egress port 2" as illustrated in the connection table for the controller. The egress port 2 is a downstream direction and 5 hops in that downstream direction would correspond to controller 7 or controller 272. If the conveyor section of controller 7 were to become full of product, such as due to too much product on the conveyor sections past the section associated with controller 7, controller 2 would stop sending more product down the conveyor and around the curve. Any product currently in transfer between controllers 2 and 7 would have room to stop on the sections affiliated with controllers 5 and 6 and the curved section would remain free of product.

Figure 6:
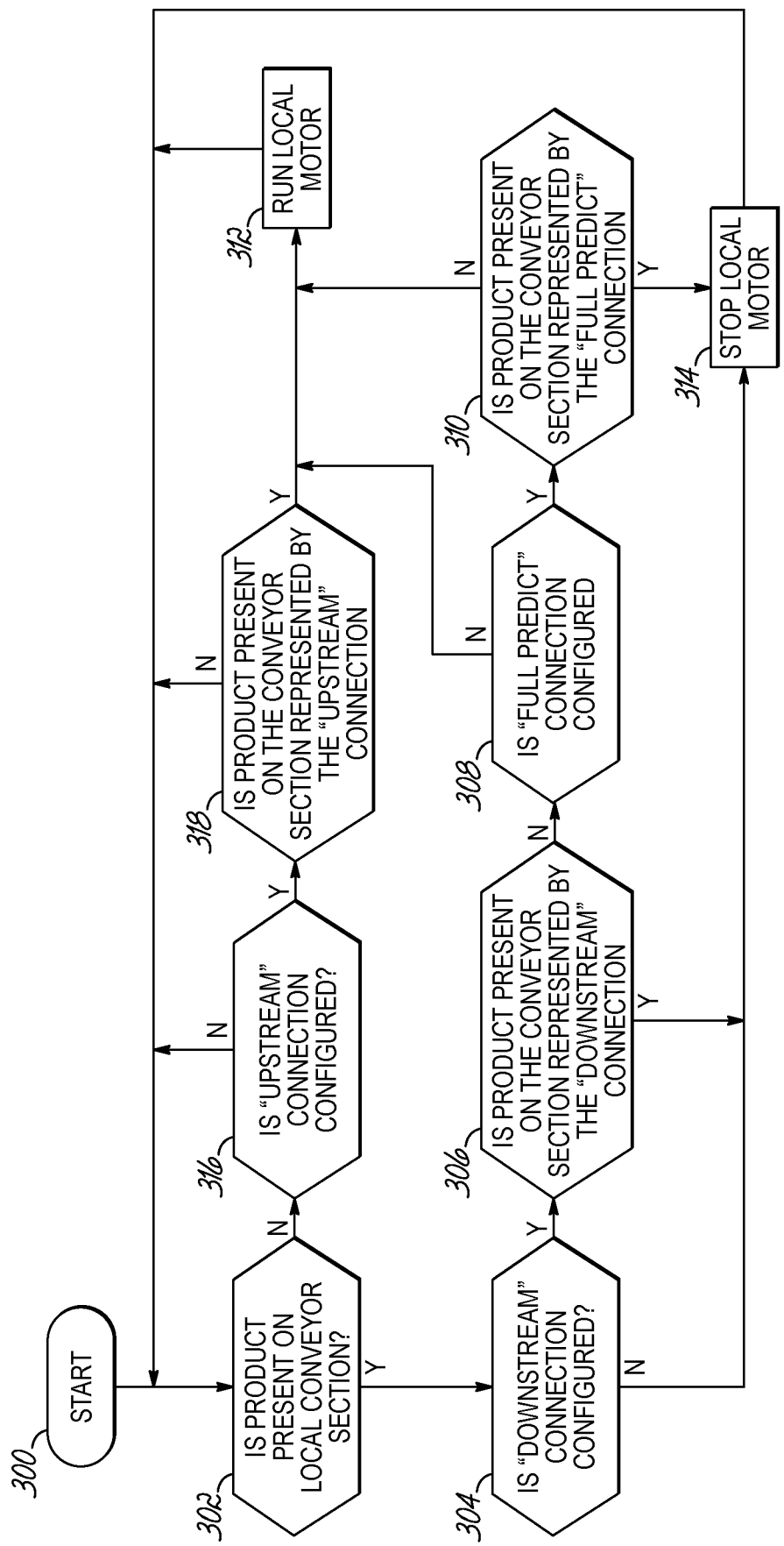
FIG. 6 is a flow diagram of an application of an embodiment of the invention as illustrated in FIG. 5.

FIG. 6 illustrates a program flow for such a feature in accordance with an embodiment of the invention. Starting at Block 300, the program flow advances to the decision Block 302 where the program determines if there is even product present on the local conveyor section, which in the example is the section affiliated with controller 262 or controller 2 in FIG. 5. For example, a photo eye (not shown) or some other sensor might indicate the existence of product in a section 254. If no product, as illustrated the flow proceeds to decision Block 316 and it is determined if an upstream connection, such as to controller 260 is even configured so that the section of controller 262 can even receive product. If not, the flow proceeds back to the start block 300 in the loop. However, if the upstream connection to the section 254 of controller 260 (i.e., controller 1) exists then at block 318 a determination is made as to whether there is product on that section 254 of the conveyor. If there is, then the yes or Y path provides for the conveyor section of controller 260 to be run, for example, to power the motor of a motorized roller associated with the conveyor section 254 to run that section and move the product to the section affiliated with controller 262 (controller 2). Thus, the upper loop of the flow chart of FIG. 6 is to check for product coming into the curve sections of the conveyor 251.

Referring again to FIG. 6, if the block 302 indicates product, the program flow proceeds to block 304 to determine if there is further conveyor sections to forward the product to. That is, block 304 determines if there is a downstream connection, such as to controller 264 (controller 3). If there is no further section 254 for the product to progress, the controller 262 provides a command to stop the section it controls, such as to stop the motor of the motorized roller running the section 254 of controller 262 as shown in Block 314. However, if there is a connection downstream, such as to the section 254 of controller 264 (controller 3), a determination is made of whether there is product present on that conveyor section (Block 306). If there is product present (Yes at Block 306), meaning you cannot move additional product downstream, then the flow proceeds to Block 314 to stop any movement of the conveyor section 254 associated with controller 262 (controller 2) and the product flow stops.

If there is not product on the downstream section 254 of controller 3 (No at Block 306), then the downstream section might be able to receive product. However, before delivering product to the curve, the Full Predict program of controller 2 (262) as represented by Blocks 308, 310 will operate to make sure that no product moving from the section 254 of controller 262 will stop on one of the curved sections 254 (controllers 3 and 4) of conveyor 251. Specifically, the Block 308 will determine if the Full Predict program and connection is configured for evaluating further downstream conditions. If Full Predict is not configured (No at Block 308), and there is no reason to evaluate the downstream condition (for example if the section of controller 262 is not at a curve) then flow proceeds to block 312 to run the conveyor and move product. If the answer to Block 308 is Yes, the flow proceeds instead to Block 310 to determine if product is present on the conveyor section noted for the Full Predict connection. That is, for the execution of the Full Predict program, communication must be established with the conveyor section 254 (controller 7). The conveyor section of controller 7 is 5 hops from the section of controller 262 through the egress Port 2 (which is the downstream direction). Controller 7 and its section 254 is the conveyor section that is downstream and past the curve. The section of interest coupled to controller 272 (indicated as controller 7) is 5 positions or hops from the section of controller 2 as noted in connection table 263 of FIG. 5A.

So, the controller 262 communicates with controller 272 using the relative addressing of the present invention to communicate with the element that is 5 hops downstream through egress Port 2 of controller 262 to determine if product is present at that conveyor section of controller 272. Without knowing the address of that controller 272, the present invention arrives at the conveyor section 254 of controller 272 as per the invention. The controller 2 communicates with controller 7 and if there is no product there, then the product that is located before the curve can progress as shown in the flow through Block 312. However, if product is present at the section of controller 7 (controller 272), then the "Full" condition is met or predicted and so product should not progress from the conveyor section of controller 2 in order to avoid having product stopped on the curve (controller 3, 4). In that case, the conveyor section 254 controller by controller 262 is stopped per Block 314. In the present example, the section 254 of controller 7 is selected because the conveyor sections of controller 5 (controller 268) and controller 6 (controller 270) are too close to the curve. Therefore, a Full Predict condition will want to be controlled by the conveyor section of the controller 272 that is further down from those two downstream sections that are adjacent the curve. Of course other arrangements may be used. For example, the Full Predict function might be executed by contacting the sections of controller 5 or 6.

While the invention has and hereinafter will be described in the context of fully functioning controllers and/or computing systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical and tangible recordable type media such as volatile and nonvolatile memory devices, floppy and other removable disks, hard disk drives, optical disks (e.g., CD-ROM's, DVD's, etc.), among others.

In addition, various program code described hereinabove or hereinafter may be identified based upon the application or software component within which it is implemented in a specific embodiment of the invention. However, it should be appreciated that any particular program nomenclature is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for communicating between networked devices that define a path having a plurality of device positions, the method comprising:
    designating a source device for a communication stream, the source device having a first port to communicate in a first direction of the path and a second port to communicate in a second direction in the path with devices networked to the source device;
    selecting a port from one of the first port or the second port of the source device for defining a direction of the communication stream from the source device to a destination device;
    providing a hop count indicating a relative location of the destination device for the communication stream, the hop count being an integer number of networked device positions from the source device to the destination device along the path in the defined direction;
    progressing a single hop from the source device selected port in the defined direction of the communication stream to another networked device coupled to the selected port;
    designating the another networked device as a new relative device and obtaining network addresses for networked devices coupled with each of a first port and a second port of the new relative device;
    decrementing the hop count;
    if the hop count is not equal to 1, iteratively progressing additional single hops in the defined direction of the communication stream and designating additional successive networked devices as new relative devices and iteratively decrementing the hop count;
    when the hop count equals 1, designating the next additional networked device from the current relative device as a destination device for the communication stream.

2. The method of claim 1 further comprising initially obtaining network addresses for networked devices coupled with each of the first port and the second port of the source device.

3. The method of claim 2 further comprising upon initially obtaining network addresses for networked devices coupled with each of the first port and the second port of the source device, evaluating the hop count, and if the hop count equals 1, determining the network address of the selected port defining the direction of the communication stream and designating the address as the destination device address.

4. The method of claim 1, wherein progressing additional single hops from the source device to another networked device includes:
    evaluating the network addresses for networked devices coupled with each of the first port and the second port of the new relative device;

excluding the network address of the networked device associated with a previous relative device;
using a remaining network address to designate the address of the next successive networked device as the new relative device.

5. The method of claim 1 further comprising, prior to designating the another networked device as a new relative device, designating a current relative device as a previous relative device.

6. The method of claim 1 further comprising upon obtaining network addresses for networked devices coupled with each of the first port and the second port of the new relative device, indicating a failure if there are other ports of the new source device in addition to the first port and second port.

7. The method of claim 1 wherein designating the next additional networked device as a destination device includes designating an address of the next additional networked device from the current relative device as a destination device address for the communication stream.

8. The method of claim 1 wherein designating the another networked device as the new relative device includes designating an address of the another networked device as a new relative device address.

9. A networked device configured for communicating with other networked devices along a path, the device comprising:
at least one processor;
a first port to communicate in a first direction of the path and a second port to communicate in a second direction of the path for communicating with other networked devices;
program code configured to be executed on the at least one processor, the program code causing the processor of the device to designate the device as a source device for a communication stream to other networked devices, to select a port from one of the first port or the second port for defining a direction of the communication stream from the source device to a destination device, and to provide a hop count indicating a relative location of the destination device for the communication stream as an integer number of networked device positions from the source device to the destination device along the path in the defined direction, the program code further configured to progress a single hop from the source device in the defined direction of the communication stream to another networked device, to designate the another networked device as a new relative device, to obtain network addresses for networked devices coupled with each of a first port and a second port of the new relative device and to decrement the hop count and if the hop count is not equal to 1, iteratively progressing additional single hops in the defined direction of the communication stream and designating additional successive networked devices as new relative devices and iteratively decrementing the hop count, the program code further configured, when the hop count equals 1, to designate the next additional successive networked device from the current relative device as a destination device for the communication stream.

10. The networked device of claim 9 wherein the program code is configured to initially obtain network addresses for networked devices coupled with each of the upstream port and the downstream port of the source device.

11. The networked device of claim 10 wherein the program code is configured, upon initially obtaining network addresses for networked devices coupled with each of the first port and the second port of the source device, to evaluate the hop count, and if the hop count equals 1, to determine the network address of the selected port defining the direction of the communication stream and designate the address as the destination device address.

12. The networked device of claim 9 wherein the program code is configured, when progressing additional single hops from the relative device to another networked device, to evaluate the network addresses for networked devices coupled with each of a first port and a second port of the new relative device, to exclude the network address of the networked device associated with a previous relative device, and to use a remaining network address to designate the address of the next successive networked device as the new relative device.

13. The networked device of claim 9 wherein the program code is configured, prior to designating the another networked device as a new relative device, to designate a current relative device as a previous relative device.

14. The networked device of claim 9 wherein the program code is configured, upon obtaining network addresses for networked devices coupled with each of the first port and the second port of the new relative device, to indicate a failure if there are other ports of the new relative device in addition to the first port and second port.

15. The networked device of claim 9 wherein the program code is configured when designating the next additional networked device as a destination device to further designate an address of the next additional networked device from the current source device as a destination device address for the communication stream.

16. The networked device of claim 9 wherein the program code is configured to designate the another networked device as the new relative device including designating an address of the another networked device as a new source device address.

* * * * *